United States Patent
Bai et al.

(10) Patent No.: US 10,225,607 B1
(45) Date of Patent: Mar. 5, 2019

(54) VIDEO PROCESSING APPARATUS AND VIDEO PROCESSING METHOD THEREOF

(71) Applicant: Novatek Microelectronics Corp., Hsinchu (TW)

(72) Inventors: Yu Bai, Shaanxi (CN); YuanJia Du, Shandong Province (CN); JianHua Liang, ShaanXi Province (CN); Xin Huang, Xi'an (CN); Cong Zhang, Shaanxi Province (CN); Kai Kang, ShaanXi Province (CN)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/889,226

(22) Filed: Feb. 6, 2018

(30) Foreign Application Priority Data

Jan. 25, 2018 (CN) .......................... 2018 1 0074030

(51) Int. Cl.
| | |
|---|---|
| *G06N 3/04* | (2006.01) |
| *H04N 19/80* | (2014.01) |
| *H04N 21/25* | (2011.01) |
| *H04N 21/236* | (2011.01) |
| *H04N 21/434* | (2011.01) |
| *H04N 21/466* | (2011.01) |
| *H04N 21/2343* | (2011.01) |
| *H04N 21/4402* | (2011.01) |

(52) U.S. Cl.
CPC ....... *H04N 21/440263* (2013.01); *G06N 3/04* (2013.01); *H04N 19/80* (2014.11); *H04N 21/23614* (2013.01); *H04N 21/234363* (2013.01); *H04N 21/251* (2013.01); *H04N 21/4348* (2013.01); *H04N 21/4666* (2013.01)

(58) Field of Classification Search
CPC ... H04N 21/440263; H04N 21/234363; H04N 21/23614; H04N 21/251; H04N 21/4348; H04N 21/4666
See application file for complete search history.

(56) References Cited

U.S. PATENT DOCUMENTS

| | | | |
|---|---|---|---|
| 8,582,654 B1 * | 11/2013 | Patti ....................... | H04N 19/86 |
| | | | 375/240.12 |
| 2017/0345130 A1 * | 11/2017 | Wang ................... | G06T 3/4046 |

* cited by examiner

*Primary Examiner* — Michael E Teitelbaum
(74) *Attorney, Agent, or Firm* — JCIPRNET

(57) ABSTRACT

The disclosure is directed to a video processing apparatus and a video processing method thereof. In one of the exemplary embodiments, the disclosure is directed to a video processing apparatus which includes not limited to a storage medium configured to store a first video file, a down-scaling module coupled to the storage medium and configured to down-scale the first video file into a second video file, a learning machine module configured to receive the first video file and a third video file which is processed from the second multimedia file and generate a trained model out of the first video file and the third video file, and a transmitter configured to transmit a data package which comprises a compression of the second video file and a compression of the trained model.

40 Claims, 9 Drawing Sheets

VIDEO PROCESSING APPARATUS AND VIDEO PROCESSING METHOD THEREOF

CROSS-REFERENCE TO RELATED APPLICATION

This application claims the priority benefit of China application serial no. 201810074030.5, filed on Jan. 25, 2018. The entirety of the above-mentioned patent application is hereby incorporated by reference herein and made a part of this specification.

TECHNICAL FIELD

The disclosure is directed to a video processing apparatus and a video processing method thereof.

BACKGROUND

A video or motion picture having high definition (HD) and decent frame rate may require a substantial bandwidth to be transported in an uncompressed format, and such required bandwidth may completely exceed a typical transmission capacity of a Gigabit Ethernet in Over-the-Top (OTT) technology. Thus, technologies of video codecs could be used to reduce video data so as the limit the required bandwidth.

However, there is an inverse relationship between the compression ratio of a video and its video quality as higher compression ratio would result in worse video qualities. Presently, videos having high resolution and high frame rate may still quite present a challenge for those who are in the video codec technology. Therefore, a video processing method and apparatus would still be needed to address the above described challenges.

SUMMARY OF THE DISCLOSURE

Accordingly, the disclosure is directed to a video processing apparatus and a video processing method thereof.

In one of the exemplary embodiments, the disclosure is directed to a video processing apparatus which includes not limited to a storage medium configured to store a first video file; a down-scaling module coupled to the storage medium and configured to down-scale the first video file into a second video file; a learning machine module configured to receive the first video file and a third video file which is processed from the second multimedia file and generate a trained model out of the first video file and the third video file; and a transmitter configured to transmit a data package which comprises a compression of the second video file and a compression of the trained model.

In one of the exemplary embodiments, the disclosure is directed to a video processing method applicable to an electronic device. The method would include not limited to: determining a first video file to be transmitted; down-scaling the first video file into a second video file; receiving, by a learning machine module, the first video file and a third video file which is processed from the second video file and generating a trained model out of the first video file and the third video file; and transmitting a data package which comprises a compression of the second video file and a compression of the trained model.

In one of the exemplary embodiments, the disclosure is directed to a video processing apparatus which includes not limited to: a receiver configured to receive a compressed data package; a data unpacking module coupled to the receiver and configured to generate a compressed video file and a compressed convolution neural network model from the compressed data package; a video decompressor coupled to the data unpacking module and configured to decompress the compressed video file to generate a first low-resolution video file; an upscaling module coupled to the video decompressor and configured to upscale the first low resolution video file into a second low resolution video file; and a data decompressor coupled to the data unpacking module and configured to decompress the compressed convolution neural network model to generate a decompressed convolution neural network model.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
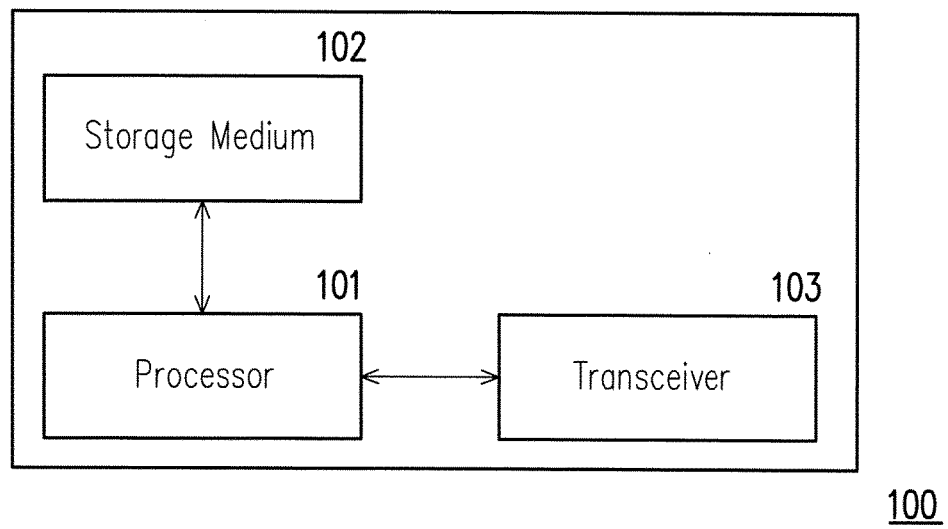
FIG. 1 illustrates a video processing apparatus which could be a video provider in terms of hardware block diagrams in accordance with one of the exemplary embodiments of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a video processing mechanism which includes a video processing apparatus and a method used by the video processing apparatus. The video processing mechanism may reduce the amount of data of a video file to be transmitted over a network which could be the Internet or an intranet and/or may reduce the bandwidth consumptions required to transmit the video file. The video processing mechanism would include but not limited to a pre-treatment of a raw video to be packaged for a subsequent transmission and a post-treatment of the previously packaged video after the transmission. The packaged video may include not limited to a compressed low resolution (LR) video and a trained model which could be, for example, a deep residual convolution neural network (DRSCN) model. Concepts of the video processing mechanism are provided in FIG. 1~FIG. 3 as well as the written descriptions that correspond to these figures.

FIG. 1 illustrates a video processing apparatus which could be a video provider in terms of hardware block diagrams in accordance with one of the exemplary embodiments of the disclosure. The video processing apparatus 100 may include not limited to a processor 101, a storage medium 102, and a transceiver 103. The video processing apparatus 100 could be a video server, an application server, a variation of an advanced version of a 5G base station (BS), macro cell BS, micro cell BS, pico cell BS, femto cell BS, "eNodeB" (eNB), a Node-B, an advanced BS (ABS), a base transceiver system (BTS), an access point, a home BS, a relay station, a scatterer, a repeater, an intermediate node, an intermediary, satellite-based communication BSs, and so forth.

The processor 101 may include one or more hardware processing units such as central processing units (CPUs), digital signal processing (DSP) chips, graphics processing units (GPUs), microcontrollers, or other programmable integrated circuits (ICs) to implement the provided video processing mechanism. Alternatively, various modules to be described in the subsequent disclosure may also be implemented by discrete integrated circuits (ICs). The storage medium 102 could be any non-transitory storage devices that are controlled by the processor 101 to store temporarily or permanent data such as video files. The storage medium 102 may also contain computer readable instructions to be loaded into the processor 101 for implementing the functions of the video processing mechanism. The transceiver 103 may include one or more a transmitter and/or a receiver that are controlled by the processor 101 to transmit and/or receive data via a cable, fiber, or wireless means. The transceiver 103 may also include one or more sets of hardware tuned to different frequency bands such as RF frequency, millimeter frequency, Bluetooth frequency, WiFi frequency, and so forth. In this disclosure, the transceiver 103 which includes the transmitter would be used to transmit video files over the Internet.

Figure 2:
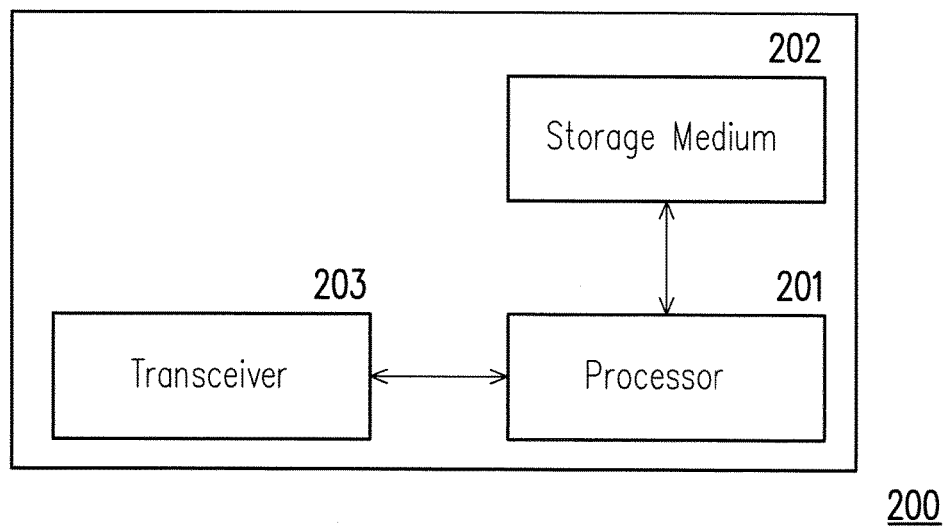
FIG. 2 illustrates a video processing apparatus which could be an electronic device that receives a video in terms of hardware block diagrams in accordance with another one of the exemplary embodiments of the disclosure.

FIG. 2 illustrates another exemplary embodiment of a video processing apparatus which could be an electronic device that receives a video in terms of hardware block diagrams. The video processing apparatus could be a personal computer (PC), a mobile electronic device, a mobile station, an advanced mobile station (AMS), a server, a client, a desktop computer, a laptop computer, a network computer, a workstation, a personal digital assistant (PDA), a tablet, a scanner, a (smart) telephone device, a watch, a pager, a camera, a television, a hand-held video game device, a musical device, a wireless sensor, a drone, and the like. In some applications, a UE may be a fixed computer device operating in a mobile environment, such as a bus, a train, an airplane, a boat, a car, and so forth.

The video processing apparatus 200 may include not limited to a processor 201, a storage medium 202, and a transceiver 203. The processor 201 may include one or more hardware processing units such as central processing units (CPUs), digital signal processing (DSP) chips, graphics processing units (GPUs), microcontrollers, or other programmable integrated circuits (ICs) to implement the provided video processing mechanism. Alternatively, various modules to be described in the subsequent disclosure may also be implemented by discrete integrated circuits (ICs). The storage medium 202 could be any non-transitory storage devices that are controlled by the processor 201 to store temporarily or permanent data such as video files. The storage medium 202 may also contain computer readable instructions to be loaded into the processor 201 for implementing the functions of the video processing mechanism. The transceiver 203 may include one or more a transmitter and/or a receiver that are controlled by the processor 201 to transmit and/or receive data via a cable, fiber, or wireless means. The transceiver 203 may also include one or more sets of hardware tuned to different frequency bands such as RF frequency, millimeter frequency, Bluetooth frequency, WiFi frequency, and so forth. In this disclosure, the transceiver 203 which includes the receiver could be used to receive video files over the Internet.

Figure 3:
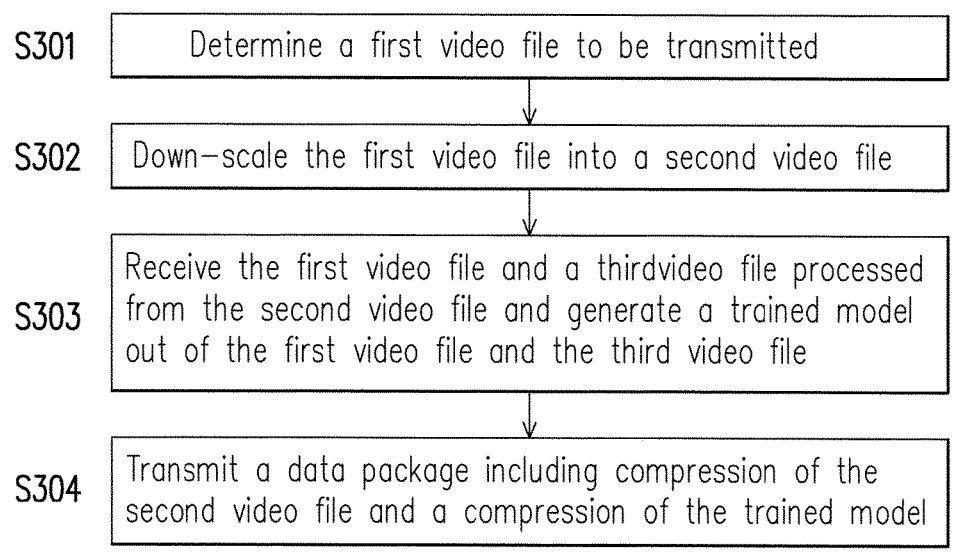
FIG. 3 is a flow chart which illustrates a video processing method in accordance with one of the exemplary embodiments of the disclosure.

FIG. 3 is a flow chart which illustrates a video processing method which is used by a video processing apparatus in accordance with one of the exemplary embodiments of the disclosure. In step S301, the video processing apparatus would determine a first video file to be transmitted. In step S302, the video processing apparatus would down-scale the first video file into a second video file. In step S303, the video processing apparatus would receive the first video file and a third video file processed from the second video file and generate a trained model out of the first video file and the third video file. In step S304, the video processing apparatus would transmit a data packet including a compression of the second video file and a compression of the trained model.

In an exemplary embodiment, to generate the above described third video file, a video compressor could be configured to compress the second video file to generate the compression of the second video file. Subsequently, a video decompressor could be configured to receive the compression of the second video file to generate a decompressed compression of the second video file. Next, an upscaling module could be configured to upscale the decompressed compression of the second video file into the third video file which is a low-resolution version of the first video file.

In an exemplary embodiment, to generate the data package for transmission, a data compressor could be configured to receive the trained model to generate the compression of the trained model, and a packaging module could be configured to receive the compression of the trained model and the compression of the second video file to generate the data package.

In an exemplary embodiment, the learning machine module could be a deep residual convolution neural network (DRSCN) module. The DRSCN module may include a plurality of DRSCN layers, configured to receive the third video file to generate a higher resolution third video file by updating weights of one or more filters within each of the DRSCN layers based on the first video file and the third video file, and output the weights of the filters within each of the DRSCN layers as a DRSCN model served as the trained model. The DRSCN module could be configured to update the weights of the filters within each of the DRSCN layers to minimize a difference between the higher resolution third video file and the first video file. Each of the plurality of DRSCN layers may include a convolution layer and an activation layer, each convolution layer may comprise a plurality of convolution neurons, and each convolution neuron may comprise a filter or multiple filters of the same size.

The concept of the above described video processing apparatus and the video processing method are further elucidated in the following exemplary embodiments as shown in FIG. 4~FIG. 12 and explained in their corresponding written descriptions.

Figure 4:
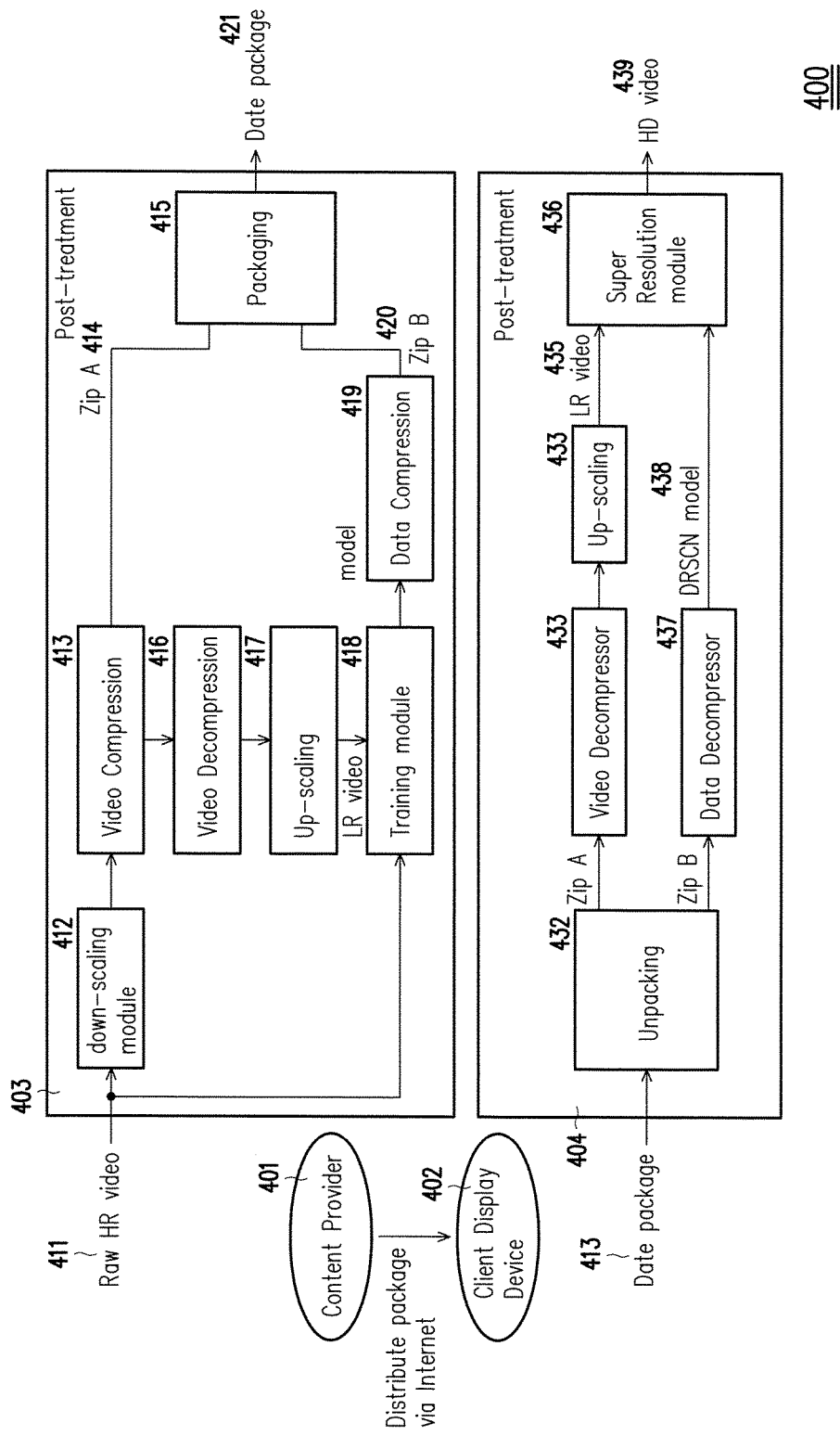
FIG. 4 illustrates a system for transmitting and receiving videos files in accordance with one of the exemplary embodiments of the disclosure.

FIG. 4 illustrates a system for transmitting and receiving videos files in accordance with one of the exemplary embodiments of the disclosure. The system 400 would include a content provider 401 (e.g. 100) that provides one or more video files to a client display device 402 (e.g. 200). The one or more video files could be provided over a network such as the Internet or an intranet. The content provider 401 may include not limited to a transmitter 403 for performing pre-treatment of a video file 411 to generate a data package 421 which corresponds to the video file 411, and the client display device 402 may include not limited to a receiver 404 for perform post-treatment of the data package 431 to reconstruct the original video file 439.

The transmitter 403 may include not limited to a down-scaling module 412, a video compressor 413, a video decompressor 416, an up-scaling module 417, a training module 418, a data compressor 419, a packaging module 415, and a transmitter (e.g. 103). Each of the above described elements (i.e. 412, 413, 415, 416, 417, 418, and 419) could be coupled to a storage medium (e.g. 102) and could be implemented by a processor (e.g. 101) or by a discrete hardware IC or by a combination of both.

The receiver 403 may include 404 may include not limited to a receiver (e.g. 203), an unpacking module 432, a video decompressor 433, an upscaling module 435, a super resolution module 436, and a data decompressor 437. Each of the above described elements (i.e. 432, 433, 435, 436, and 437) could be coupled to a storage medium (e.g. 202) and could be implemented by a processor (e.g. 201) or by a discrete hardware IC or by a combination of both.

The transmitter 403 of the content provider 401 would perform pre-treatment by obtaining a first video file 411 which could be a raw high resolution (HR) video. The first video file 411 could be procured from a storage medium (e.g. 102) or obtained externally through a transceiver (e.g. 103). The down-scaling module 412 would down-scale the first video file into a second video file which would resemble the first video file but has a lesser video resolution than the first video file. The video compressor 413 would receive the second video file from the output of the down-scaling module 412 and generate a compression of the second video file 414. The video decompressor 416 would receive the compression of the second video file 414 to generate a decompressed compression of the second video file. The upscaling module 417 would receive and upscale the decompressed compression of the second video file into a third video file which is a LR version of the first video file. The learning machine module 418 would receive the first video file 411 and the third video file to generate a trained model based on the first video file 411 and the third video file.

The trained model from the learning machine 418 would be transmitted to the receiver 404 for reconstructing the first video file 411. The learning machine module 418 may include a conventional or improved version of a regression module or a convolution neural network module. The learning machine module 418 may also be a conventional or improved implementation of a deep residual convolution neural network (DRSCN) module, a super resolution using deep convolutional neural network (SRCNN) module, or a very deep convolution network (VDSR) module. A data compressor 419 would receive the trained module to generate a compression of the trained model 420. A packaging module 415 would receive the compression of the second video file 414 and the compression of the trained model to generate a data package 421. A transmitter (e.g. 103) would subsequently transmit to the client display device 402 the data package 421 which may include not limit to the compression of the second video file 414 and the compression of the trained model 420.

The receiver 404 of the client display device 402 would perform post-treatment by receiving, via a transceiver (e.g. 203), a data package 431 which has been compressed and would correspond to the data package 421 from the transmitter 403. The data unpacking module 432 would receive and unpack the compressed data package 431 and generate a compressed video file and a compressed trained model which could be a convolution neural network model. A video decompressor 433 would decompress the compressed video file to generate a first LR video file. An upscaling module 434 would receive the first LR video file and upscale the first LR video file into a second LR video file 435 which has a higher resolution then the first LR video file. A data decompressor 437 would decompress the compressed trained model to generate a decompressed trained model 438. A convolution neural network based super resolution module 436 would receive the second low resolution video file 435 and the decompressed trained model 438 to generate a high-resolution video file 439 which is a reconstruction of the first video file 411.

The super resolution module 436 could be a conventional or an improved implementation of a deep residual convolution neural network (DRSCN) module, a Super Resolution using Deep Convolutional Neural Network (SRCNN) module, or a very deep convolution network (VDSR) module.

The trained model may include many filters, and the operation of the learning machine module 418 will be presented in further details. In general, a video modeling method based on a convolution neural network method has been a popular image super resolution algorithm in recent years. However, the video modeling method provided in this disclosure generates the trained model by using the first video file 411 which is a raw HR video and the third video file which is a LR version of the first video file and the instead of an external database. Assuming that the DRSCN scheme is used, the video modeling method would involve mainly two parts. First, the learning machine module 418 in the transmitter side 403 would train and record a mapping relation between the HR and the LR of the same HR video file by using filter banks having one or more filters. More concretely, the learning machine module 418 would receive a higher resolution third video file from the up-scaling module 417, update weights of the one or more filters within each of DRSCN layers based on the first video file 411 and the third video file, and output the weights of the filters within each of the DRSCN layers as a DRSCN model serving as the trained model. Second, the LR version of the video file would be super resolved in the super resolution module 436 of the receiver side 404 by using the trained model received from the transmitter 403.

Figure 5:
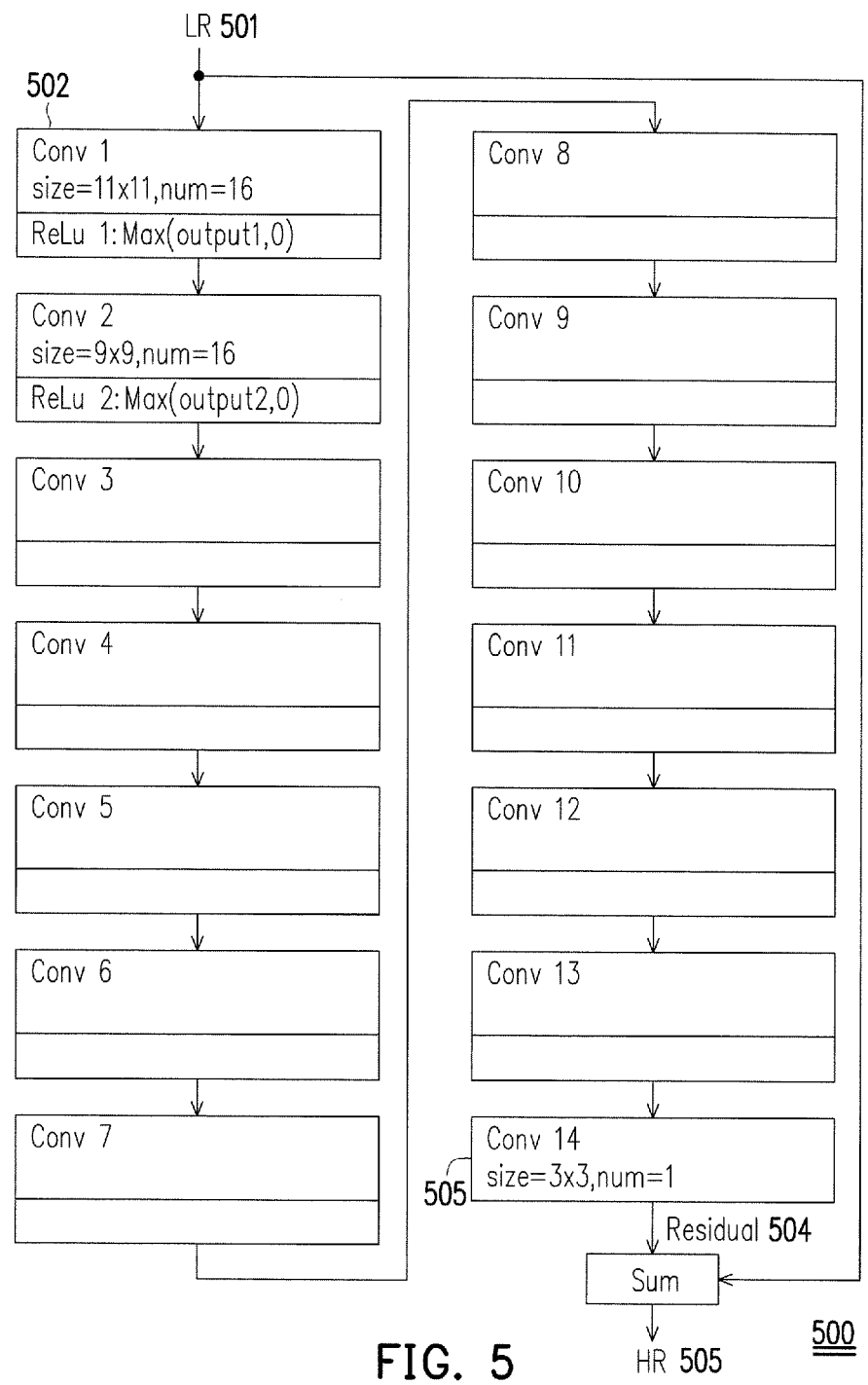
FIG. 5 illustrates a structure of Deep Residual Convolution Neutral Network (DRSCN) in accordance with one of the exemplary embodiments of the disclosure.

FIG. 5 illustrates an example of the learning machine module 418 which is assumed to be implemented based on a deep residual convolution neutral network (DRSCN) in accordance with one of the exemplary embodiments of the disclosure. The DRSCN may include a plurality of DRSCN layers. In the exemplary embodiment of FIG. 5, the DRSCN is assumed to have 14 layers, but the number of layers can be adjusted based on a tradeoff between various factors including modeling accurate and computation speed. Except the last layer 503, each layer (e.g. 502) of the DRSCN layers includes one convolution layer and one activation layer (ReLu). The last layer 503 has only convolution layer but not activation layer. Each convolution layer may include a plurality of convolution neurons. Each convolution neuron may include one or more convolution filters (i.e. kernels) with same size (i.e. quantity) of rows and clos. For instance, the first convolution layer 502 which receives the third video file 501 as the input is the shallowest layer and contains the size of 11×11 filters and 16 neutrons, and the next convolution layer would contain the size of 9×9 filters and also 16 neurons. Each convolution neuron would generate an output by summing results of inner kernels. The number of convolution kernels could be equal to the number of output of a previous convolution layer.

The last convolution layer 503 would contain only one neuron which receives outputs from all neurons of a preceding convolution layer to. All outputs 504 from all neurons will be received together with the third video file 501 to generate the higher resolution third video file 505. For the proposed scheme as shown in FIG. 5, generally the size of convolution kernels would gradually decrease from shallow layers to deeper layers, and the convolution neurons would gradually decrease from shallow layers to deep layers.

Figure 6:
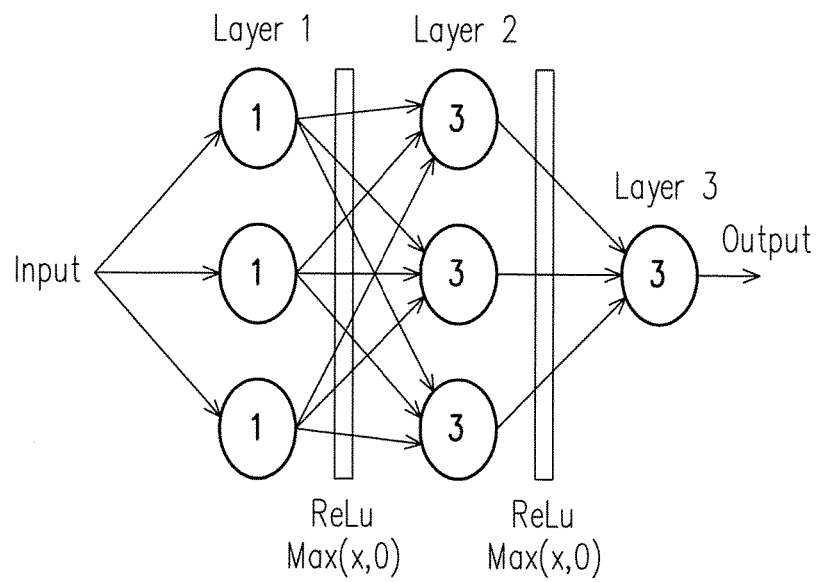
FIG. 6 illustrates an example of interactions among layers in accordance with one of the exemplary embodiments of the disclosure.

Further details regarding how different layers of FIG. 5 would interact is provided as an example which is shown in FIG. 6. FIG. 6 is a smaller example of an implementation of a neural network model, but an actual embodiment of a DRSCN would typically be a larger structure. For simplicity's sake, there are three layers in FIG. 6, in which each circle of each layer would represent a neuron as each neuron could be in a matrix. A neuron can contain one or more filters, and each filter could be a matrix of weights. In general, a single neuron would output one result. For example, in layer 1, there are 3 neurons, and the number in each of the neurons signifies the number of filters. This means that each neutron of layer 1 contains one filter, and each filter would have a same size (e.g. height=3, width=3). In layer 2, there are 3 neurons, and each of neurons would contain three filters of a same size (e.g. height=5, width=5). In layer 3, there is only one neuron which contain three filters of a same size (e.g. height=3, width=3). For the exemplary embodiment of FIG. 4, assuming that neural network model of FIG. 6 is to be used in the learning machine module 418, the input into layer 1 of FIG. 6 would be the third video file which is a low resolution (LR) version of the raw HR video 411. Three copies of the third video file will enter layer 1 as each of the neurons will receive a copy. Subsequently, there would be three different outputs after the convolution in layer 1. When entering layer 2, each neuron of layer 1 will send an output to all neurons of layer 2 and thus three copies of each output of each neuron of layer 1 would be sent to each neutron of layer 2. When entering layer 3, each neuron of layer 2 will send its output to the single neuron of layer 3. The same principle would apply if there are more than three layers.

Figure 7:
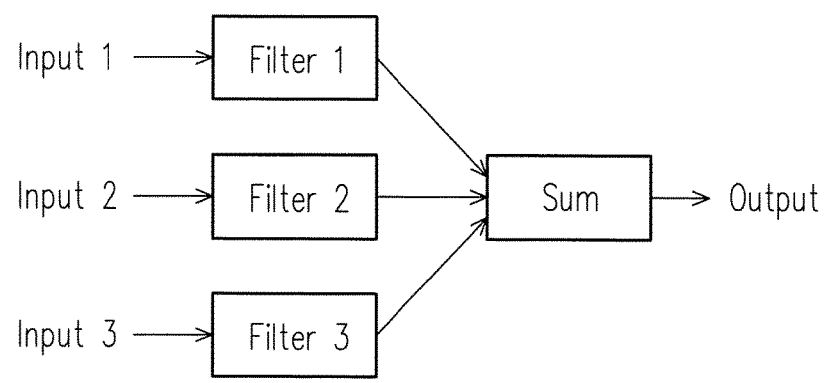
FIG. 7 illustrates an output of a neuron by summing three results of a convolution in accordance with one of the exemplary embodiments of the disclosure.

Within each neuron, the output of the neuron is calculated by summing the results of all filters of a neuron. As shown in FIG. 7, within a neuron of layer 2, three results of convolution will be summed to obtain the output of the neuron. Therefore, there would be three outputs after layer 2. The calculation for the output the neuron of layer 3 would be the same as one of the neurons of layer 2. After layer 1 and layer 2, there would also be an activation layer (i.e. a ReLu layer).

Figure 8:
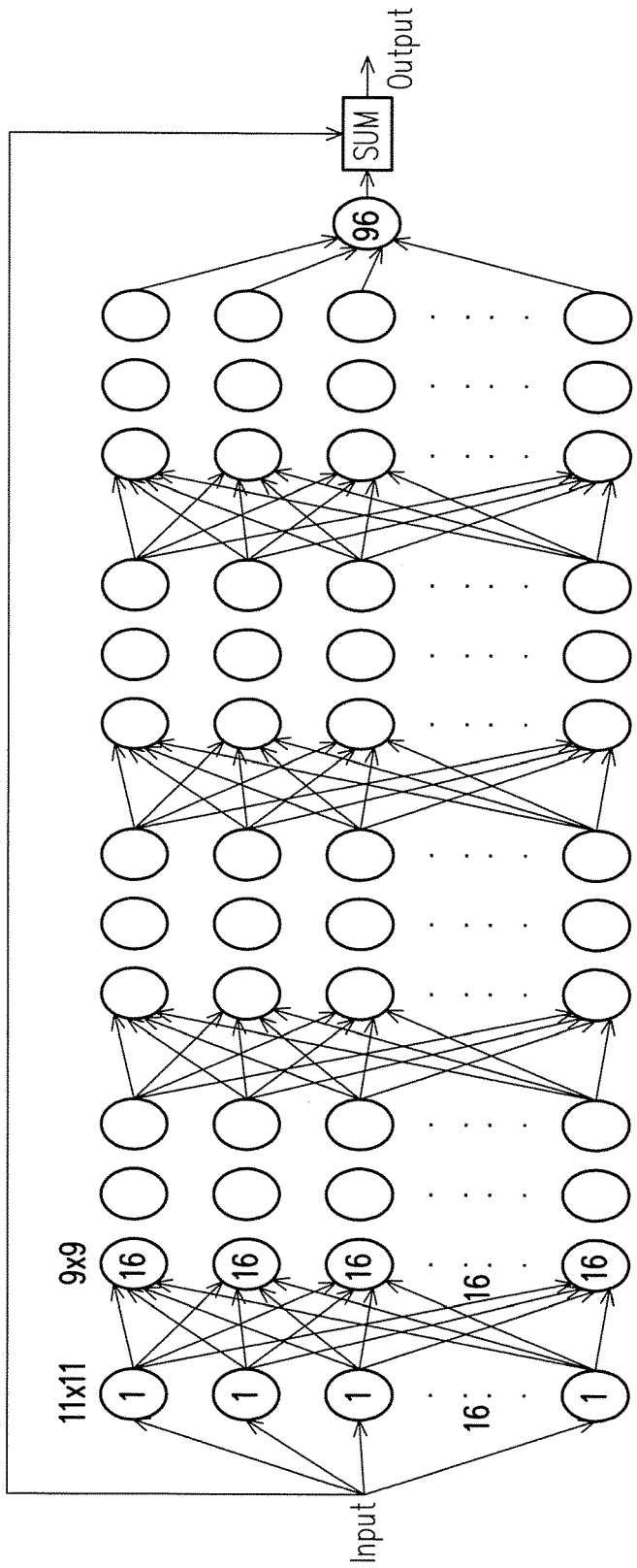
FIG. 8 illustrates an example of a DRSCN model in accordance with one of the exemplary embodiments of the disclosure.

FIG. 8 shows a comprehensive DRSCN model as an example. The DRSCN model of FIG. 8 corresponds to the exemplary embodiment of FIG. 5. For simplicity's sake, some obvious lines and ReLu layers are not marked. In FIG. 8, each column represents a different convolution layer of FIG. 5. For example, the first convolution layer has 16 neurons as each neuron contains one filter of size 11×11 rows and clos, the second convolution layer has 16 neurons as each neuron contains 16 filters of size 9×9 rows and clos, and so forth. Each neuron of a layer would output its result to all neurons of the next layer except for the last layer. The last layer as shown in FIG. 8 would sum up the outputs of 96 neurons together with the input which is the third video file to generate a HR estimate of the third video file.

Figure 9:
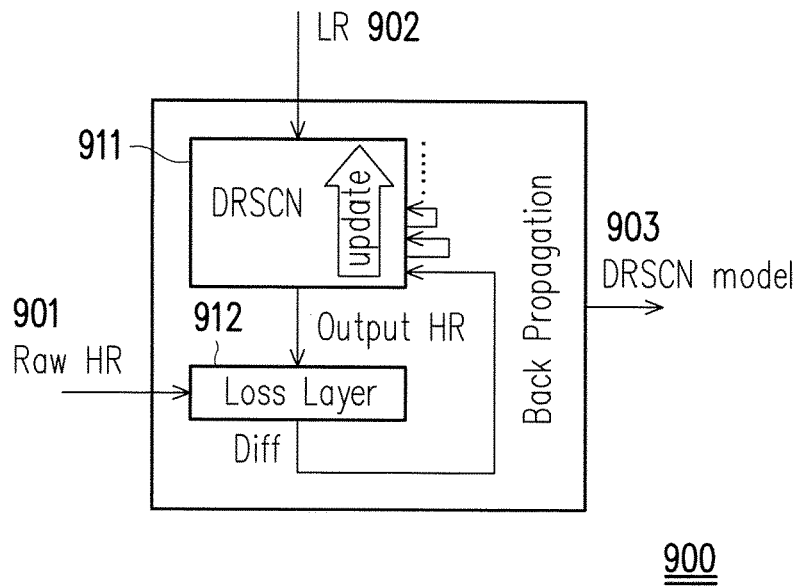
FIG. 9 illustrates a training procedure of a DRSCN model in accordance with one of the exemplary embodiments of the disclosure.

FIG. 9 illustrates a training procedure of a DRSCN module in accordance with one of the exemplary embodiments of the disclosure. The DRSCN module 900 of FIG. 9 could be one of the implementations of the learning machine module 418. The DRSCN 911 would receive a raw HR video file 901 (i.e. 411) and a LR video file 902 (i.e. the previously described third video file) and generate a DRSCN model 903 accordingly. The inputs 901 902 to the DRSCN module 900 could be a single video frame or a sequence of video frames. Different from a conventional DRSCN technique, the training technique used in this disclosure derives a DRSCN model 903 from self-training based on input video files instead of an established database. By using techniques such as stochastic gradient descent (SGD) or the technique previously described in FIG. 5 and FIG. 8, the DRSCN 911 would receive the LR video file (e.g. 501) and output a HR video file (e.g. 505).

The DRSCN module 900 would further include a loss layer module 912 which receives the raw HR video file 901 and the output HR video file so as to calculate a difference between the raw HR video file 901 and the output HR video file. By transmitting the difference as feedback information back to the DRSCN 911, the DRSCN 911 would iteratively train the DRSCN model by updating the weights of the filters within each of the convolution layers of the DRSCN 911 in order to minimize the difference between the raw HR video file 901 and the output HR video file. Once the above described difference reaches zero or a specific value, the training would be complete, and then the weights of the filters would be the data for the DRSCN model.

Figure 10:
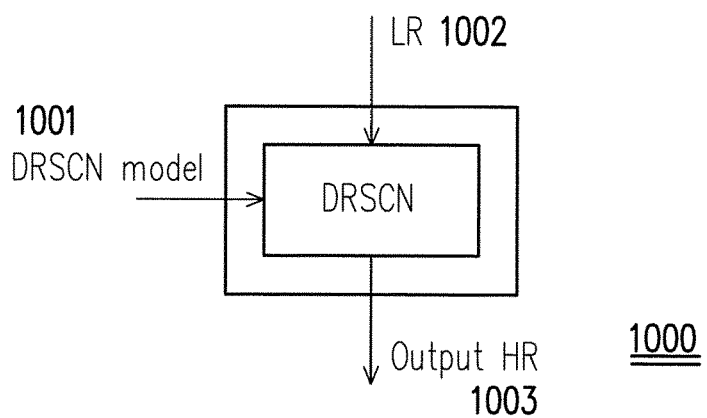
FIG. 10 illustrates a data flow of a DRSCN based super resolution processing in accordance with one of the exemplary embodiments of the disclosure.

FIG. 10 illustrates a data flow of a DRSCN based super resolution module in accordance with one of the exemplary embodiments of the disclosure. The super resolution module 1000 described in FIG. 10 could be an implementation of the super resolution module 436 of FIG. 4. The super resolution module 1000 would receive a LR video file 1002 and a DRSCN module 1001 to perform multi-layer convolution so as to super resolve a HR video file. The LR video file 1002 could be the previously described second LR video 435 and the decompressed DRSCN module 438 which could be derived as the DRSCN model 903 by using the previously described DRSCN method of FIG. 9.

Figure 11:
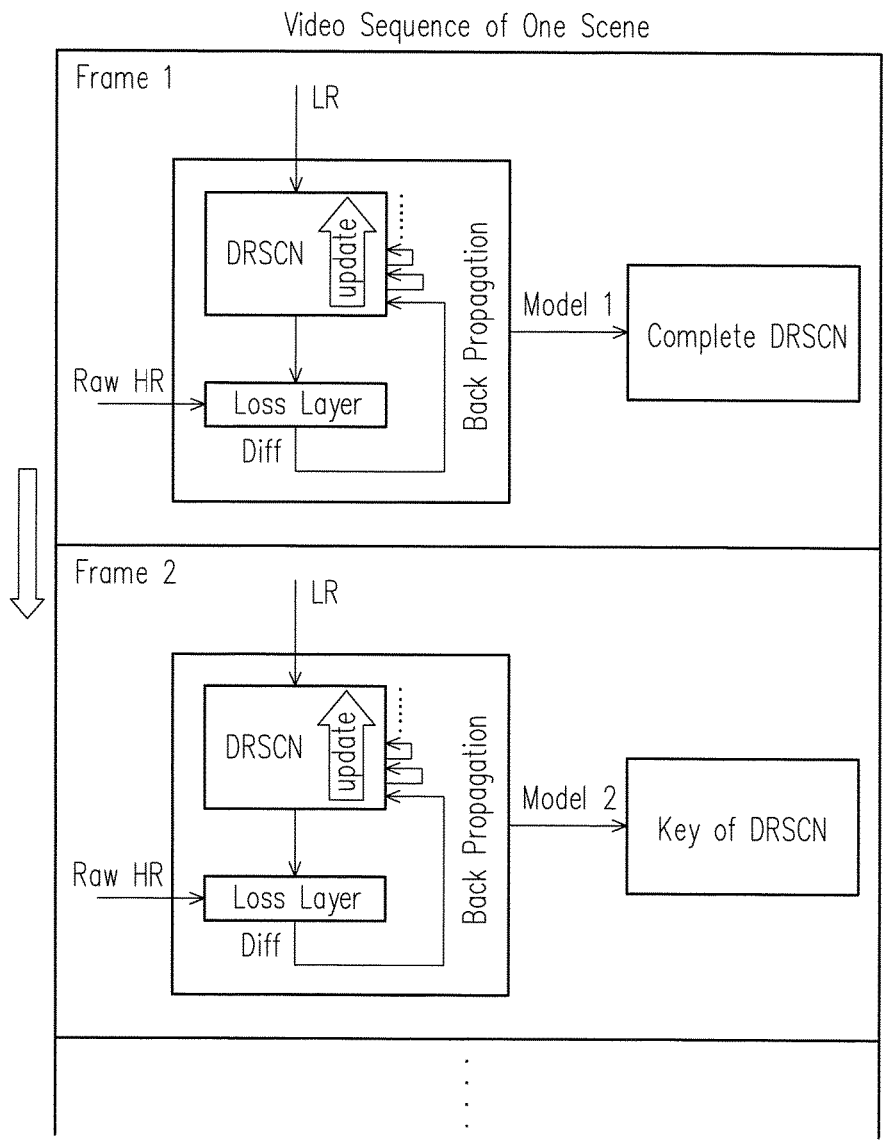
FIG. 11 illustrates a data compression method of a DRSCN model in accordance with one of the exemplary embodiments of the disclosure.

FIG. 11 illustrates a data compression method of a DRSCN model in accordance with one of the exemplary embodiments of the disclosure. Since a DRSCN model may contain hundreds of thousands weights, compression must be done to meet the transmission requirements. To achieve such, the disclosure proposes an inter-frame residual convolution neural network model data compression as part of the DRSCN process of FIG. 9. Since the contents among consecutive frames could be similar, data of one video frame could be shared with an adjacent frame or among other video frames. In this way, the required data could be minimized by sharing data. Referring to FIG. 11, while Frame 1 training, a complete DRSCN model (e.g. 903) could be used for the initialization of another DRSCN model of another video frame. The complete DRSCN Model could be recorded or exported. While Frame 2 is training, Frame 2 may utilize the DRSCN model of Frame 1 by using just a small part of the DRSCN model of Frame 1. After the training of Frame 2 is complete, The DRSCN model for Frame 2 may only need to include new data at crucial positions of the DRSCN. Subsequently, a complete version of DRSCN for Frame 2 can be reconstructed by summing together the DRSCN of Frame 1 and the DRSCN of Frame 2.

Figure 12:
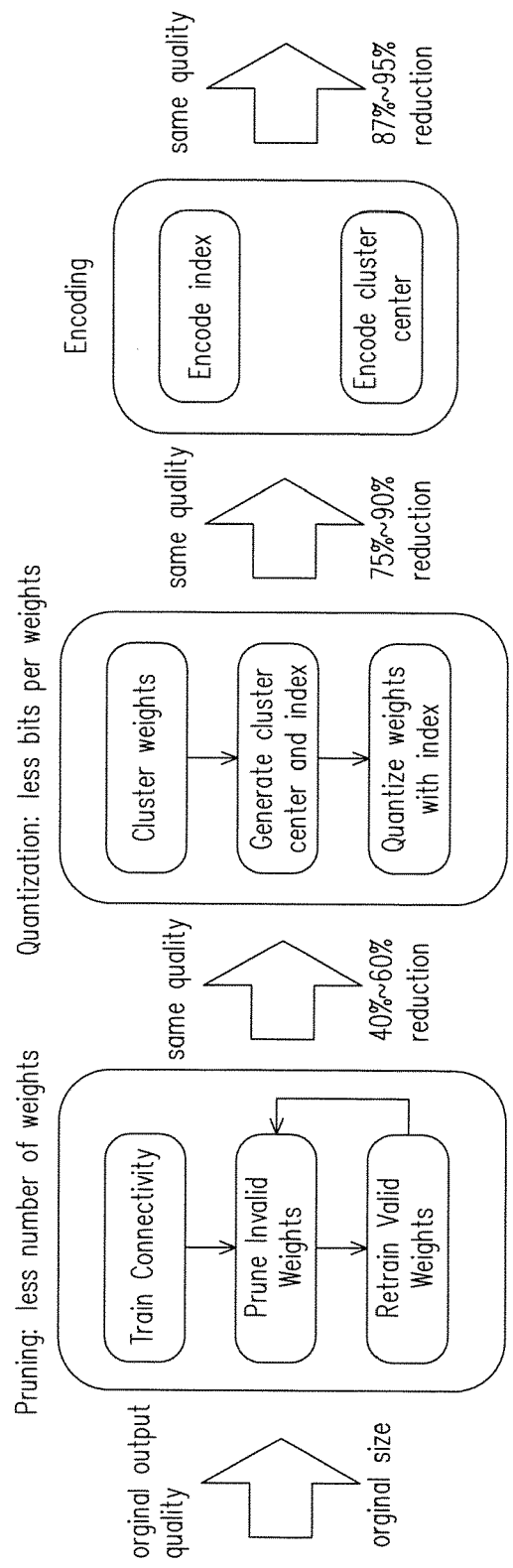
FIG. 12 illustrates an operation after a training process in accordance with one of the exemplary embodiments of the disclosure.

FIG. 12 illustrates an operation after a training process in accordance with one of the exemplary embodiments of the disclosure. The operation after training process would include a process of pruning process, a quantization process, and an encoding process. After the above described processes are complete, the original image quality of the raw HR video 411 transmitted by the content provider 401 relative to the output HR video 439 received and reconstructed by the client display device 402 is generally not degraded at a level that is noticeable by human eyes. Moreover, and the data of the output HR video 439 could be reduced between 87% and 95% relative to the raw HR video 411. Each of the processes is further provided in further details.

The first process is the pruning process which will reduce the number of required filtering weights of a DRSCN model. Invalid weights such as small weights in each filter of convolution layers could be removed. The process would train connectivity in a short term, then the small weights would be removed, and valid weights would be retained. After several iterations from pruning to retraining, 40%-60% of weights each filters of convolution layers could be removed.

The next process is the quantization process which reduces the number of bits per weight. A weight could be represented for example as a 16-bits binary number per layer and can be classified into a small amount of (64) clusters. The center value of each cluster can replace the weights which belong to this cluster. In this way, each weight may only need to be represented by, for example, a 6-bits binary index number. In this way, 75%-90% data could be removed by reducing the number of bits per weight.

The last process is the encoding process. The encoding process may compress data by using a common data compression technology such as a 7-zip compression technique. After the encoding process, the data of the output HR video 439 could be reduced between 87% and 95% relative to the raw HR video 411.

In view of the aforementioned descriptions, the disclosure is suitable for being used in a video processing apparatus and is able to reduce the data of video files transmitted over a network and/or to reduce the bandwidth consumption required to transmit the video files over the network.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A video processing apparatus comprising:
a storage medium configured to store a first video file;
a down-scaling module coupled to the storage medium and configured to down-scale the first video file into a second video file;
a learning machine module configured to receive the first video file and a third video file which is processed from the second multimedia file and generate a trained model out of the first video file and the third video file; and
a transmitter configured to transmit a data package which comprises a compression of the second video file and a compression of the trained model.

2. The apparatus of claim 1 further comprising:
a video compressor configured to compress the second video file to generate the compression of the second video file;
a video decompressor configured to receive the compression of the second video file to generate a decompressed compression of the second video file; and
an upscaling module configured to upscale the decompressed compression of the second video file into the third video file which is a low-resolution version of the first video file.

3. The apparatus of claim 1 further comprising:
a data compressor configured to receive the trained model to generate the compression of the trained model; and
a packaging module configured to receive the compression of the trained model and the compression of the second video file to generate the data package.

4. The apparatus of claim 1, wherein the learning machine module comprises
a regression module.

5. The apparatus of claim 1, wherein the learning machine module comprises
a convolution neural network module.

6. The apparatus of claim 1, wherein the convolution neural network module is
a deep residual convolution neural network (DRSCN) module, a Super Resolution using Deep Convolutional Neural Network (SRCNN) module, or a very deep convolution network (VDSR) module.

7. The apparatus of claim 6, wherein the convolution neural network module is
a DRSCN module comprising a plurality of DRSCN layers, configured to receive the third video file to generate a higher resolution third video file by updating weights of one or more filters within each of the DRSCN layers based on the first video file and the third video file, and output the weights of the filters within each of the DRSCN layers as a DRSCN model served as the trained model.

8. The apparatus of claim 7, wherein the DRSCN module is configured to update the weights of the filters within each of the DRSCN layers to minimize a difference between the higher resolution third video file and the first video file.

9. The apparatus of claim 8, wherein each of the plurality of DRSCN layers comprises a convolution layer and an activation layer, each convolution layer comprises a plurality of convolution neurons, and each convolution neuron comprises a filter or multiple filters of the same size.

10. The apparatus of claim 8, wherein filter sizes within each of the plurality of DRSCN layers gradually decrease from a first convolution layer of the plurality of DRSCN layers to a last convolution layer of the plurality of DRSCN layers, and quantities of convolution neurons within each of the plurality of DRSCN layers gradually increase from the first convolution layer to the last convolution layer.

11. The apparatus of claim 10, wherein the first convolution layer comprises a plurality of neurons, and each of neurons receives the third video file and generates a respective output from a respective filter, and the respective filters of the neurons have the same sizes.

12. The apparatus of claim 11, wherein each of the convolution layers between the first convolution layer and the last convolution layer comprises a plurality of neurons, each of the neurons receives all outputs of all of the neurons of a preceding adjacent layer and generates a respective output based on respective filters of the neuron.

13. The apparatus of claim 10, wherein the last convolution layer comprises a neuron which receives outputs from all neurons of a preceding adjacent layer convolution layer of the last convolution layer and calculates a sum of all of the outputs to generate the higher resolution third video file.

14. The apparatus of claim 7, wherein the DRSCN module configured to receive the first video file and the third video file to generate the DRSCN model comprising:
   receiving a first frame of the third video file to generate a first DRSCN model;
   receiving a second frame of the third video file to train a second DRSCN model by using a portion of the first DRSCN model; and
   generating the second DRSCN model with the portion of the first DRSCN model in combination with an updated portion of the second DRSCN model.

15. The apparatus of claim 1 further comprising:
   a receiver configured to receive a compressed data package;
   a data unpacking module coupled to the receiver and configured to generate a compressed video file and a compressed deep residual convolution neural network (DRSCN) model from the compressed data package;
   a video decompressor coupled to the data unpacking module and configured to decompress the compressed video file to generate a first low-resolution video file;
   an upscaling module coupled to the video decompressor and configured to upscale the first low resolution video file into a second low resolution video file; and
   a data decompressor coupled to the data unpacking module and configured to decompress the compressed DRSCN model to generate a decompressed DRSCN model.

16. The apparatus of claim 15 further comprising:
   a DRSCN based super resolution module coupled to the upscaling module and the data decompressor and configured to receive the second low resolution video file and the decompressed DRSCN model to generate a high-resolution video file.

17. A video processing method applicable to an electronic device, the method comprising:
   determining a first video file to be transmitted;
   down-scaling the first video file into a second video file;
   receiving, by a learning machine module, the first video file and a third video file which is processed from the second video file and generating a trained model out of the first video file and the third video file; and
   transmitting a data package which comprises a compression of the second video file and a compression of the trained model.

18. The method of claim 17 further comprising:
   compressing the second video file to generate the compression of the second video file;
   receiving the compression of the second video file to generate a decompressed compression of the second video file; and
   upscaling the decompressed compression of the second video file into the third video file which is a low-resolution version of the first video file.

19. The method of claim 17 further comprising:
   receiving the trained model to generate the compression of the trained model; and
   receiving the compression of the trained model and the compression of the second video file to generate the data package.

20. The method of claim 17, wherein the learning machine module comprises
   a regression module.

21. The method of claim 17, wherein the learning machine module comprises
   a convolution neural network module.

22. The method of claim 17, wherein the convolution neural network module is
   a deep residual convolution neural network (DRSCN) module, a Super Resolution using Deep Convolutional Neural Network (SRCNN) module, or a very deep convolution network (VDSR) module.

23. The method of claim 22, wherein the convolution neural network module is
   a DRSCN module comprising a plurality of DRSCN layers, configured to receive the third video file to generate a higher resolution third video file by updating weights of one or more filters within each of the DRSCN layers based on the first video file and the third video file, and output the weights of the filters within each of the DRSCN layers as a DRSCN model served as the trained model.

24. The method of claim 23, wherein the DRSCN module is configured to update the weights of the filters within each of the DRSCN layers to minimize a difference between the higher resolution third video file and the first video file.

25. The method of claim 24, wherein each of the plurality of DRSCN layers comprises a convolution layer and an activation layer, each convolution layer comprises a plurality of convolution neurons, and each convolution neuron comprises a filter or multiple filters of the same size.

26. The method of claim 23, wherein filter sizes within each of the plurality of DRSCN layers gradually decrease from a first convolution layer of the plurality of DRSCN layers to a last convolution layer of the plurality of DRSCN layers, and quantities of convolution neurons within each of the plurality of DRSCN layers gradually increase from the first convolution layer to the last convolution layer.

27. The method of claim 26, wherein the first convolution layer comprises a plurality of neurons, and each of neurons receives the third video file and generates a respective output from a respective filter, and the respective filters of the neurons have the same sizes.

28. The method of claim 27, wherein each of the convolution layers between the first convolution layer and the last convolution layer comprises a plurality of neurons, each of the neurons receives all outputs of all of the neurons of a preceding adjacent layer and generates a respective output based on respective filters of the neuron.

29. The method of claim 26, wherein the last convolution layer comprises a neuron which receives outputs from all neurons of a preceding adjacent layer convolution layer of the last convolution layer and calculates a sum of all of the outputs to generate the higher resolution third video file.

30. The method of claim 23, wherein receiving, by the DRSCN module, the first video file and the third video file to generate the DRSCN model comprising:
   receiving a first frame of the third video file to generate a first DRSCN model;
   receiving a second frame of the third video file to train a second DRSCN model by using a portion of the first DRSCN model; and
   generating the second DRSCN model with the portion of the first DRSCN model in combination with an updated portion of the second DRSCN model.

31. A video processing apparatus comprising:
a receiver configured to receive a compressed data package;
a data unpacking module coupled to the receiver and configured to generate a compressed video file and a compressed trained model from the compressed data package;
a video decompressor coupled to the data unpacking module and configured to decompress the compressed video file to generate a first low-resolution video file;
an upscaling module coupled to the video decompressor and configured to upscale the first low resolution video file into a second low resolution video file; and
a data decompressor coupled to the data unpacking module and configured to decompress the compressed convolution neural network model to generate a decompressed trained model.

32. The apparatus of claim 31 further comprising:
a convolution neural network based super resolution module coupled to the upscaling module and the data decompressor and configured to receive the second low resolution video file and the trained model to generate a high-resolution video file.

33. The apparatus of claim 31, wherein the trained model is a convolution neural network model which has been trained from a deep residual convolution neural network (DRSCN) module, a Super Resolution using Deep Convolutional Neural Network (SRCNN) module, or a very deep convolution network (VDSR) module.

34. The apparatus of claim 33, wherein the convolution neural network model has been trained from a DRSCN module comprising a plurality of DRSCN layers, configured to receive the second low resolution video file to generate a higher resolution third video file by updating weights of one or more filters within each of the DRSCN layers, and output the weights of the filters within each of the DRSCN layers as a DRSCN model served as the trained model.

35. The apparatus of claim 34, wherein the DRSCN module is configured to update the weights of the filters within each of the DRSCN layers to minimize a difference between a higher resolution video file and a lower resolution video file.

36. The apparatus of claim 35, wherein each of the plurality of DRSCN layers comprises a convolution layer and an activation layer, each convolution layer comprises a plurality of convolution neurons, and each convolution neuron comprises a filter or multiple filters of the same size.

37. The apparatus of claim 35, wherein filter sizes within each of the plurality of DRSCN layers gradually decrease from a first convolution layer of the plurality of DRSCN layers to a last convolution layer of the plurality of DRSCN layers, and quantities of convolution neurons within each of the plurality of DRSCN layers gradually increase from the first convolution layer to the last convolution layer.

38. The apparatus of claim 37, wherein the first convolution layer comprises a plurality of neurons, and each of neurons receives the third video file and generates a respective output from a respective filter, and the respective filters of the neurons have the same sizes.

39. The apparatus of claim 38, wherein each of the convolution layers between the first convolution layer and the last convolution layer comprises a plurality of neurons, each of the neurons receives all outputs of all of the neurons of a preceding adjacent layer and generates a respective output based on respective filters of the neuron.

40. The apparatus of claim 37, wherein the last convolution layer comprises a neuron which receives outputs from all neurons of a preceding adjacent layer convolution layer of the last convolution layer and calculates a sum of all of the outputs to generate the higher resolution third video file.

* * * * *